UNITED STATES PATENT OFFICE.

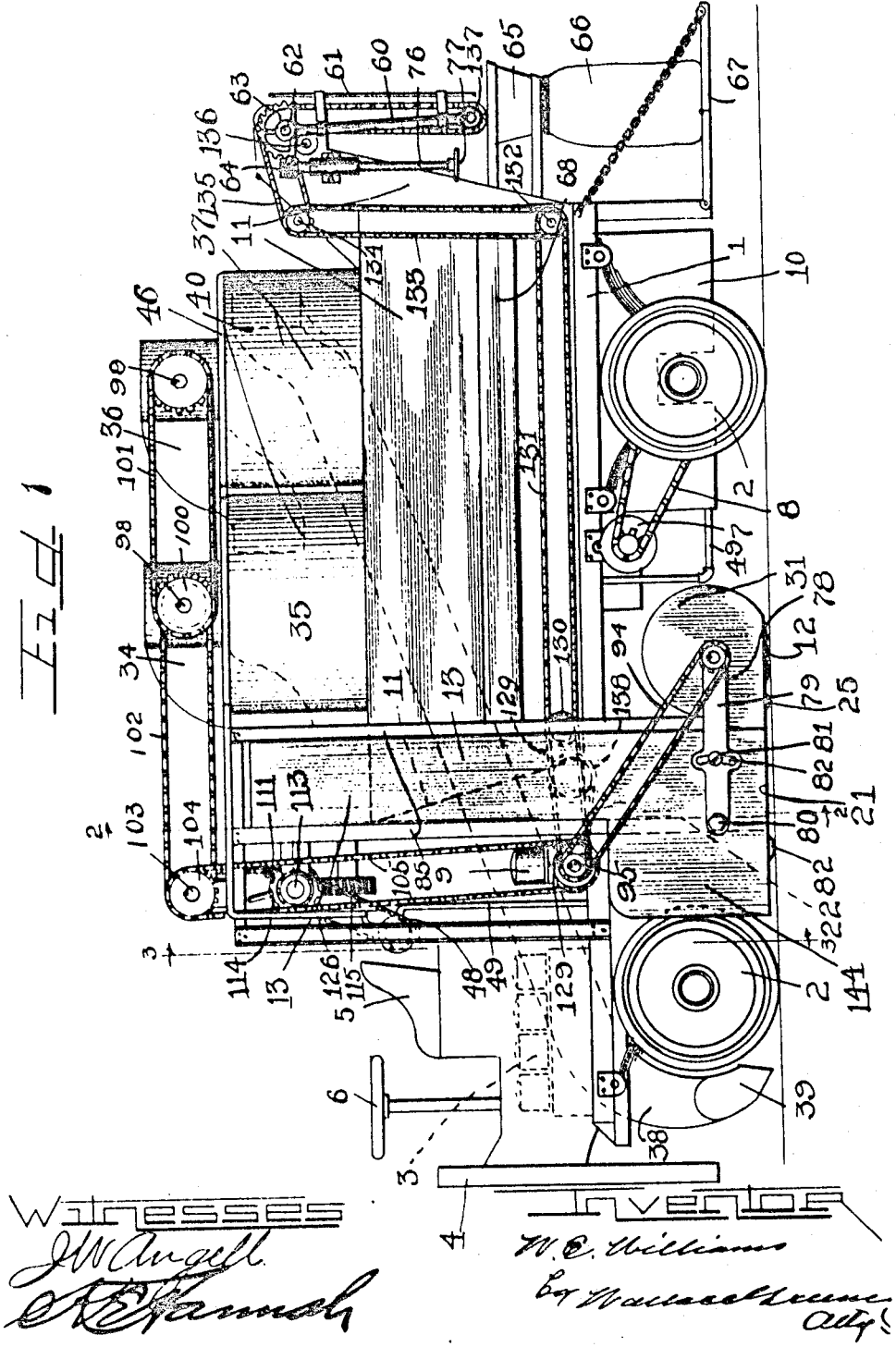

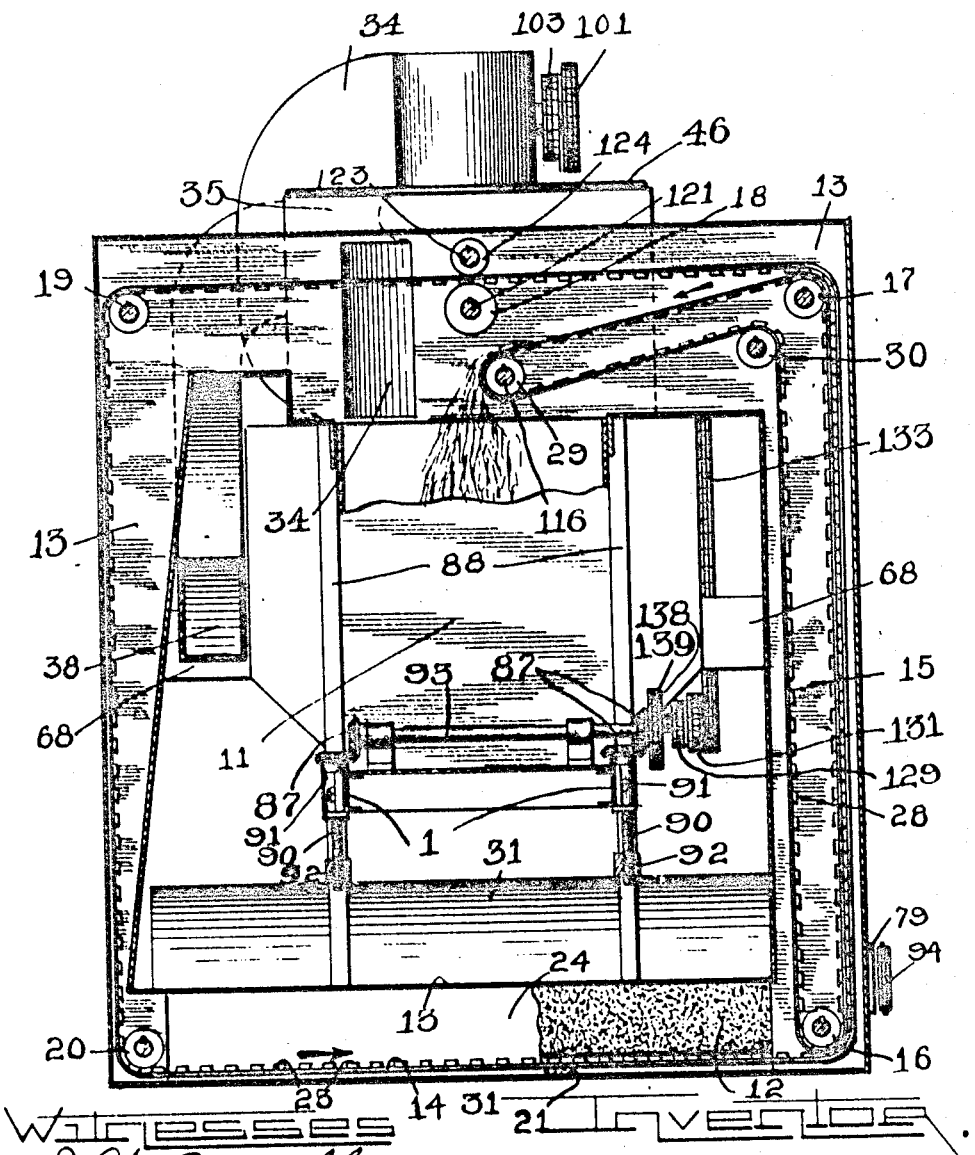

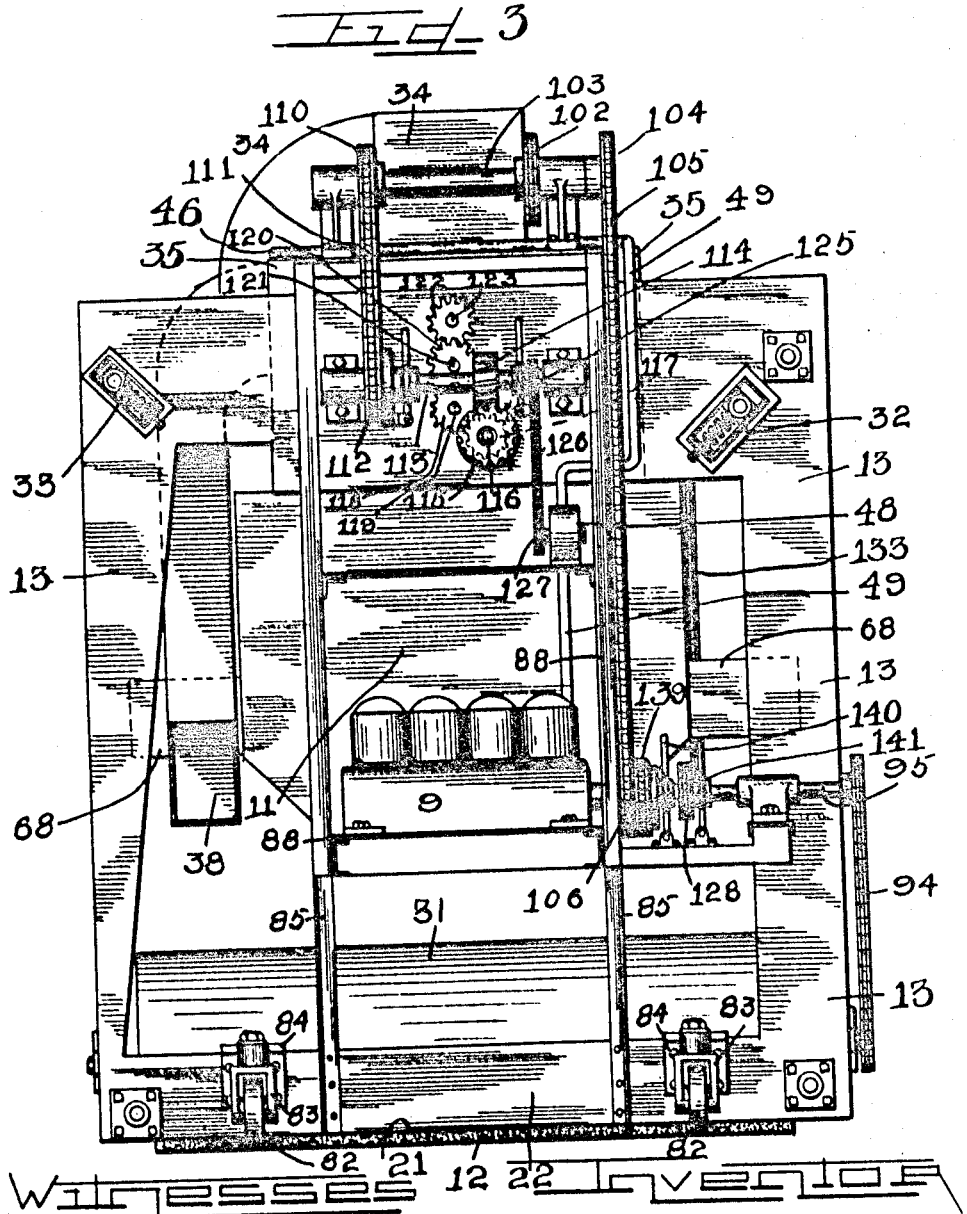

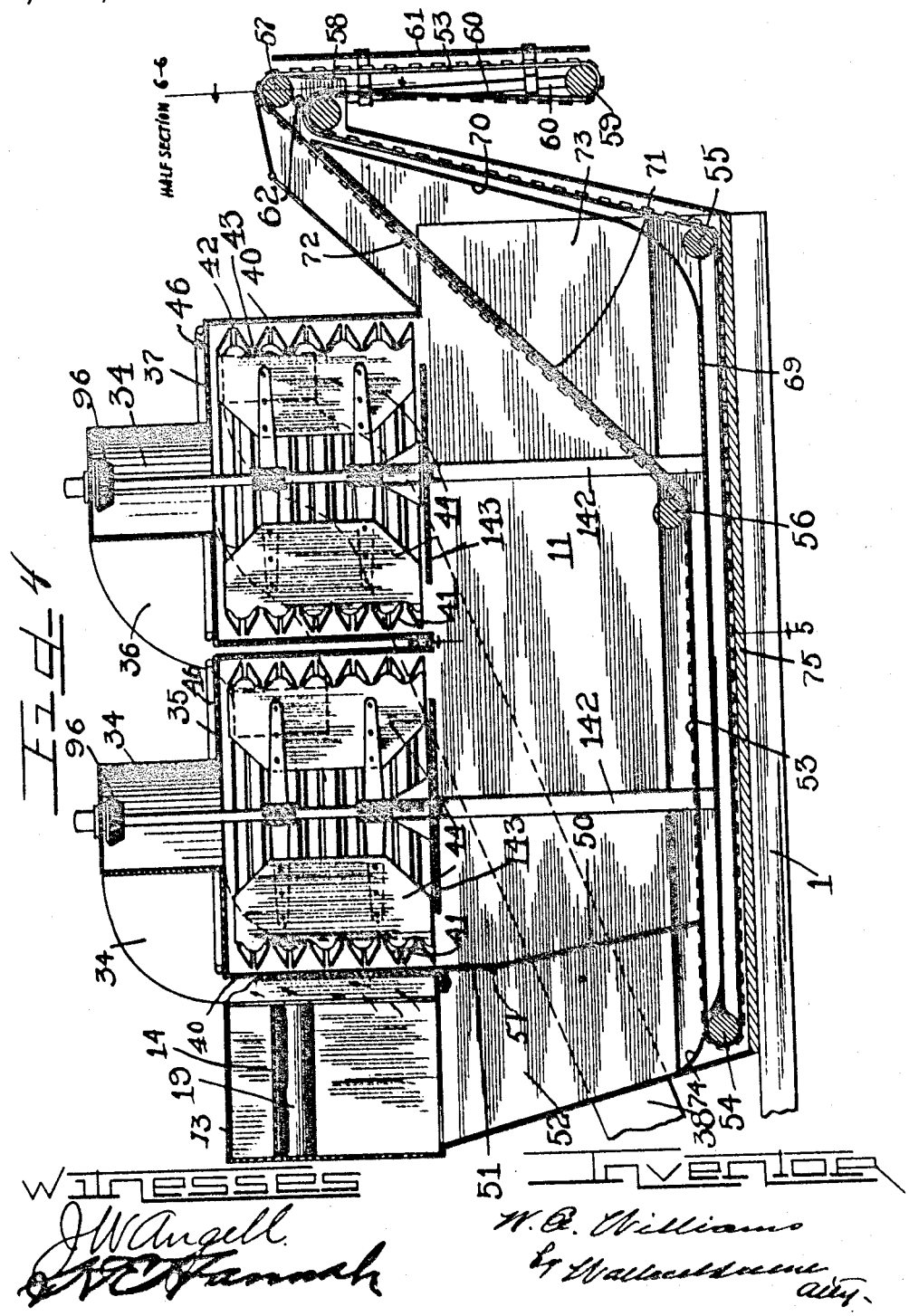

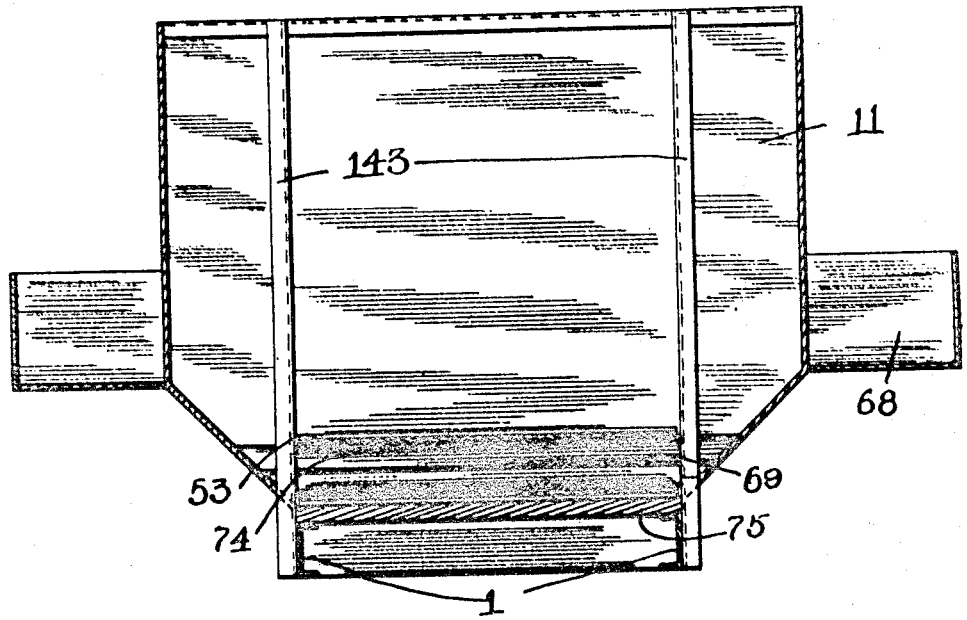
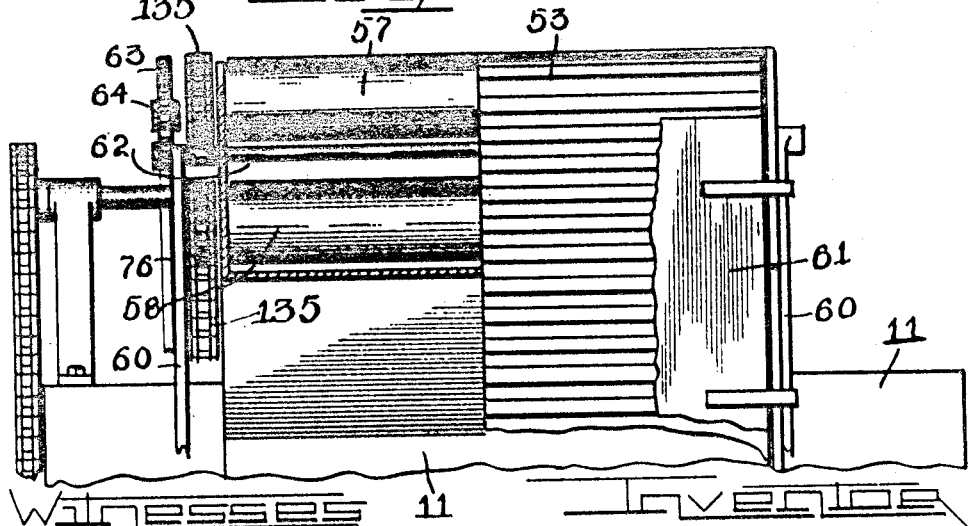

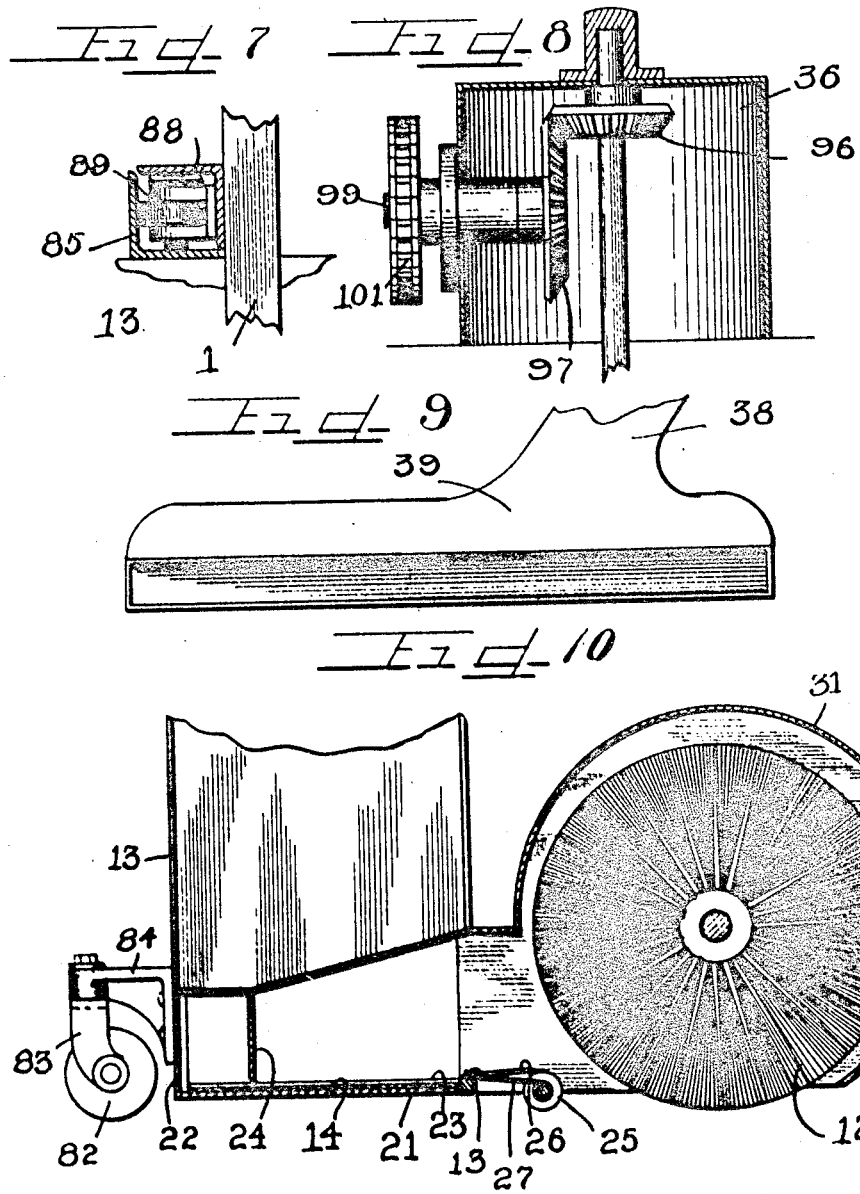

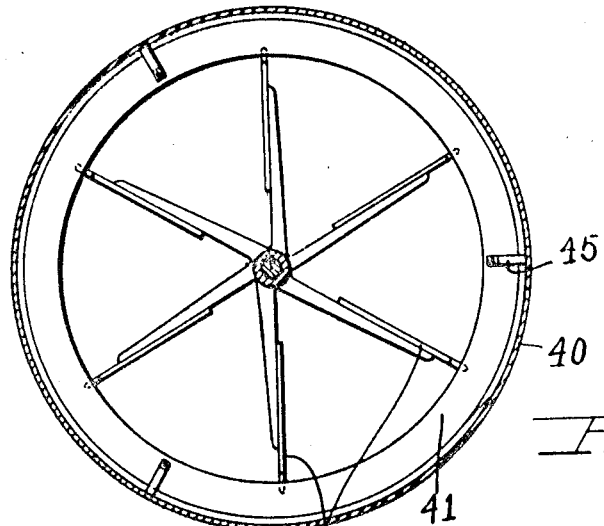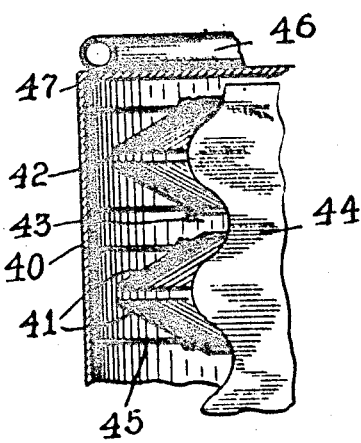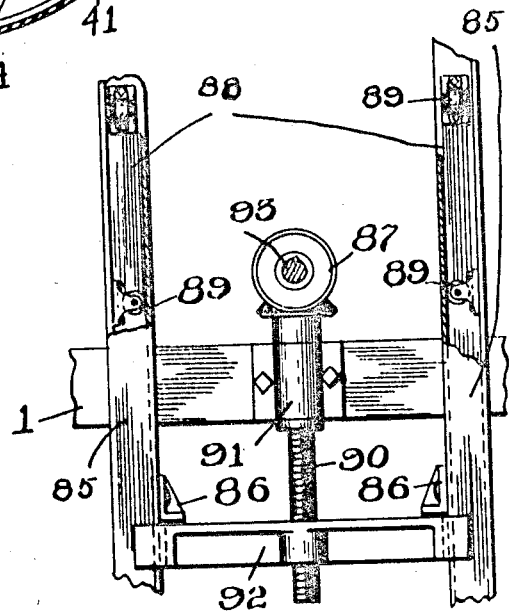

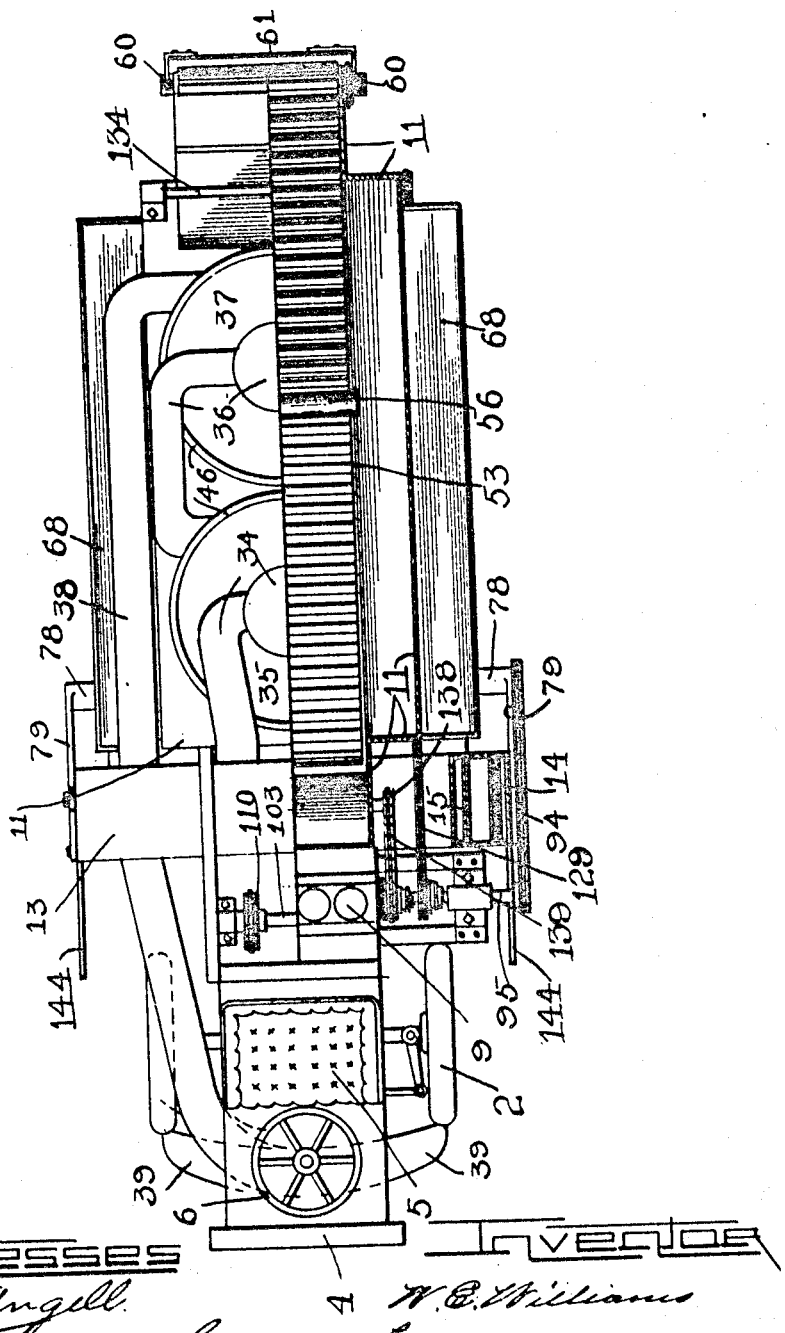

WILLIAM ERASTUS WILLIAMS, OF CHICAGO, ILLINOIS.

STREET-CLEANING MACHINERY.

1,181,279.

Specification of Letters Patent.  Patented May 2, 1916.

Application filed November 8, 1909.  Serial No. 526,798.

*To all whom it may concern:*

Be it known that I, WILLIAM ERASTUS WILLIAMS, a citizen of the United States, and a resident of Chicago, in the county of Cook and State of Illinois, with a post-office address at 331 South Clinton street, in said city, have invented a new and useful Improvement in Street-Cleaning Machinery, of which the following is a specification.

The object of my invention is to produce a street cleaning machine that will automatically take up all the material usually found on the street, including small stones and the like and semi-liquid matter, and deposit the same in a carrier box provided on the machine and will, when desired, discharge the contents of the box into a vehicle, sacks, or other receptacle provided, or discharge the contents on to a dump therefor.

Reference will be had to the accompanying drawings in which—

Figure 1 is a side elevation of the machine with some details omitted. Fig. 2 is a vertical cross-section of the machine showing the elevating mechanism on line 2—2 of Fig. 1. Fig. 3 is a similar cross-section to Fig. 2 but in front of Fig. 2 on line 3—3 of Fig. 1. Fig. 4 is a longitudinal vertical cross-section of the box or magazine for carrying the cleanings or sweepings and of the fan dust collectors in connection therewith. Fig. 5 is a cross-section of the sweepings box on line 5—5 of Fig. 4. Fig. 6 is a rear end detail showing details of the belt mechanism for unloading or discharging the box of sweepings. Fig. 7 is a detail of a part of the guiding mechanism for directing the rise and fall of the brush frame. Fig. 8 is a detail of the driving mechanism of the fans. Fig. 9 is a detail of the wind discharge pipe's mouth. Fig. 10 is a detail cross-section through the brush. Fig. 11 is a horizontal section of one of the fans and dust collectors. Fig. 12 is a vertical detail in relation to the fans and dust collectors. Fig. 13 is a detail showing the mechanism for lifting the elevating mechanism frame. Fig. 14 is a plan of the machine partly in section.

The machine is substantially like a modern motor truck having a frame of iron shown by 1 in the drawings and wheels 2 driven by a forward engine 3 and provided with a front cooling radiator 4 and driver's seat 5 and steering wheel 6 and provided with the ordinary gear box 7 and a chain drive 8 for the rear wheels.

An auxiliary engine 9 is provided to drive the entire cleaning mechanism so that the ordinary automobile motor mechanism is confined to moving the vehicle. The levers and connections for handling the vehicle as an ordinary motor car of this class are omitted for clearness of illustration.

Below the frame 1 there is a water tank 10, Fig. 1, carrying water not to be used to sprinkle the streets but to be used to sprinkle down the dust in the dust collectors and in the sweepings box.

Mounted upon top of the frame 1 there is a carrying box 11 for carrying the accumulated sweepings which are taken up by the mechanism of the machine as will now be described.

Suitably mounted across the machine in a "floating frame" 13 there is a rotary brush 12 which is driven quite rapidly and suitably mounted in the same frame there are some carrying and elevating belts 14 and 15 (see Fig. 2). The belt 14 is provided with slats 23 across its inner surface and is guided by suitable rollers 16, 17, 18, 19, and 20 to run around and as it were encircle the entire machine like a vertically arranged girdle or girth and the bottom section of this belt lies flatly directly in front of the brush 12 and as near to the surface of the street as practicable and it is protected by a bottom iron plate 21 and a front plate 22 (see Fig. 10) of the frame 13. The action of the brush is to throw the sweepings upward and forward on to the inner side of this belt 14 (see Fig. 10). A stop 24 arrests the sweepings before they reach the back wall 22 whereby the sweepings are made to fall more nearly in the center of the belt 14. A roller 25, with scrapers 26 made in several sections and connected by links 27 to frame 13, rides on the street surface and prevents the sweepings from being driven under the belt protecting bottom 21. The belt 15 in Fig. 2 is provided with slats 28 on its inner side and it is trained over rollers 16, 17, 29 and 30 and it travels in the same time with belt 14. The material falling on the inner side of the belt 14 is carried up between this belt and belt 15 from roller 16 to roller 17 and then it is discharged downward into the sweepings box 11 at roller 29.

The floating frame 13 is made in any suitable manner and is here shown as formed with an inclosure embracing the belts 14 and 15 on all sides save at an opening in front of the brush 12 along the bottom section of belt 14 and at an opening at the top of the sweepings box 11, just below roller 29. The brush 12 is also inclosed with a hood 31 covering it almost entirely excepting in front toward the belt 14 and at contact side with the street.

Elastic take ups 32 and 33, Fig. 3, of any suitable construction are provided to keep the tension on belts 14 and 15 in a manner that they may adjust themselves to a varying quantity of material that is being taken up between them.

Opening out from the inclosure around the belts 14 and 15 at the top of the machine there is a pipe 34 flexibly connected to inclosure of frame 13 and extending to the top or entrance to a dust collecting fan 35 and from this fan there is a pipe 36 connecting to a similar fan 37. Thus a compound fan arrangement is provided for sucking or exhausting the air up from the street at the region of disturbance of the surface by the brush. The air discharged by the fan 37 is carried by pipe 38 down forward to the street surface in front of the take up mechanism and discharged by a flaring nozzle 39 of the pipe 38. The fans 35 and 37 Figs. 4, 11 and 12 are so constructed that they aid in collecting dust as well as in conveying it. On the interior of the outside casing 40 of the fans, there are a series of deflecting blades 41 arranged concentrically around the fan wheels 44 in a manner that there is a space between their outside rims and the casing 40 and there are narrow openings 42 and 43, between the blades for escape of material through these openings which may be thrown out by the centrifugal action of the fans. The material thus thrown out lodges against the casing 40 and drops down along the side of the casing into the box 11. The blades 41 are supported in place by the strips 45 at suitable intervals around the casing. The purpose of the deflecting blades 41 is to furnish a sort of a neutral zone at the outside of the casing wherein the air is not so much agitated as it is in the region of the movement of the fan blades 44 permitting a settling of the dust and matter, thrown out by centrifugal action, into the carrier box below.

A water pipe 46 with many little nozzles 47 discharges a small quantity of water downward on the insides of the fan casings 40 whereby the inside of the casing is always wet inducing a settlement of any dust that may come in contact with this water or moisture. The water for this sprinkling of the fan interiors is taken from the water tank 10 by a suitable pump 48 (see Fig. 3) connected to the driving mechanism driven by engine 9 of the machine and suitable piping 49 and valve connections not shown are provided. In the event that the material taken up is dusty and dry sufficient water will be discharged down on the inside of the fan casings into the box 11 that the material in the box 11 will be sufficiently moist that it will not again be lifted up by the fans and the central areas around the fan shafts at the bottom are closed by plates 148 leaving the outer rim only, open to the box 11. Thus the suction of the fan is made to come in from the top pipe 34. A deflecting flexible curtain 50 swinging from a hinge 51 prevents the air forced by the fan blades from passing backward out of box 11 around up through the forward end 52 of the box to be again carried around through the fan on a short circuit as it were.

The box 11 is provided with an automatic discharging device for unloading the contents which may be of any suitable construction but I prefer to use a slatted belt arranged in the box somewhat like a false bottom and extending outward over the rear end of the machine in a manner to permit the discharge of the material into a vehicle that may be drawn up in position to receive the material at suitable intervals. This slatted belt is indicated by 53 (see Fig. 4) and is guided and driven by rollers 54, 55, 56, 57, 58 and 59. The latter roller 59 is mounted in a swing frame 60, Fig. 1, which is hinged at 62 to the machine and is controlled by a mutilated worm wheel 63 and worm 64 on hand wheel shaft 76 with hand wheel 77, whereby the arm 60 and roller 59 may be extended horizontally in a manner to discharge into a vehicle at the rear of the machine. In the event of the material of the sweepings being of suitable nature at any time, it may be discharged directly downward into hoppers 65, Fig. 1, and by them discharged into sacks 66 supported by a folding platform 67 at the rear of the machine where an operator will be stationed. The material will be guided into the hoppers as it falls off the belt by the shield 61 mounted on the swinging arm 60. Boxes 68 alongside the machine are provided for carrying the empty bags and as the bags of material are filled they may be dropped off at intervals. The platform 67 may be folded up to clear the vehicle that may be placed behind the machine to receive the sweepings.

A false bottom 69 is placed between the incoming and the outgoing sections of belt 53 in the bottom of box 11 for the purpose of keeping the load of material off from the incoming section of the belt and this false bottom 69 extends upward at 70 to join at an angle a second plate 71 which supports the inclined outgoing portion of the belt 53. the two plates being in position to protect the belt and to form a pocket 73 from which any accumulated material may be removed by a side gate (not shown) in the box 11.

A fender 74 made of flexible material such as thick rubber belting prevents all but liquid material from escaping down to the lower or incoming section of belt 53 along the real bottom 75 of box 11, Fig. 4. Any material that does get into the space between bottoms 69 and 75 will be carried out by the travel of the slatted belt 53. Thus the machine may run along the street until a full load of sweepings is gathered into box 11 and then the entire load be dumped or the sweepings may be sacked up as fast as gathered and the sacks thrown off without stopping the machine.

The brush 12 is mounted in suitable bearings 78 fixed to arms 79 pivoted at 80 to floating frame 13 of the machine and the position of this arm in relation to the frame may be adjusted by the screws 81 in slots 82 of arms 79.

Frame 13 is intended to ride or "float" upon the street surface by means of the contact with the street surface of the rotary brush 12 and caster wheels 82 mounted in suitable stands 83 pivoted to blocks 84 fixed to frame 13. (See Fig. 10.)

Frame 13 is connected to frame 1 of the machine by any suitable means, but I prefer to use four upright angles 85, Figs. 2, 7 and 13, connected to the balance of frame 13 at the sheets forming the inclosure as described and the other necessary frame pieces. These angles 85 are guided and supported by four other angles 88 fixed to the frame of the machine and the angles 88 are provided with anti-friction rollers 89 working against angles 85.

The frame 13 is lifted by screws 90 (see Fig. 13) supported in blocks 91 fixed in frame 1 of machine, which screw into bars 92 that slide on bars 85 but are arrested at a desired point by stops 86 fastened to bars 85. Thus when bars 92 are let down by the screws the floating frame 13 may ride on the street surface on its own supporting caster wheels and brush but when desired the screws 90 are operated to lift the bars 92 and when they abut against the blocks 86 the further lifting lifts the frame 13. The screws 90 are driven by gears 87 upon a shaft 93 driven by a sprocket 138 and chain 139 from shaft 95 of engine 9 and a clutch operated by a lever 140 engages and disengages this shaft from the driving sprocket, see Fig. 3.

A clutch 141 engages and disengages the driving mechanism for unloading box 11.

The rotary brush 12 is driven by a chain 94 from a sprocket wheel on shaft 95 of engine 9. Fans 35 and 37 are driven by bevel gears 96 engaging bevel gears 97 (see Fig. 8) on shafts 98 and 99 which are connected together by sprockets 100 and a chain 101. Fig. 1, and shaft 98 is driven by chain 102 by a sprocket on shaft 103. Shaft 103, Fig. 3, is driven by sprocket 104 on its end driven by chain 105 driven by a sprocket 106 on engine shaft 95 of engine 9. A sprocket 110 on shaft 103, (see Fig. 3) drives a chain 111 which drives sprocket 112 on a shaft 113 which is mounted on and carried by floating frame 13. On this shaft there is a spiral gear 114 engaging a spiral gear 115 on a shaft 116 of roller 29, Fig. 2, whereby roller 29 is driven by a gear 117, (shown in dotted lines in Fig. 3) on shaft 116 which engages and drives an idle gear 118 on a stud 119. The gear 118 engages and drives gear 120 on shaft 121 of roller 18 and gear 120 engages and drives gear 122 on shaft 123 which is the shaft of roller 124. The belt 14 is held against the latter roller by the guide roller 18, before mentioned, and is therefore driven thereby. A sprocket 125 on shaft 113 drives a chain 126 which drives a sprocket 127 which drives the rotary pump 48 for supplying water to the fans.

The movement of the floating frame 13 requires a flexible connection of the driving mechanism that drive its parts with the rigid parts of the machine and this is provided for by the chains 111 and 126, having tightener pulleys which are omitted here for clearness. Any suitable driving mechanism may be used for these several parts instead of what I have here preferred to show.

Power is applied to move the discharging belt 53 of the box 11 (see Figs. 1 and 4) by a chain belt 135 passing around sprocket wheels on the shaft 134, the shaft 62 of roller 57, the shaft 137 of roller 59, the shaft 136 of roller 58; and this belt 135 is itself driven from the engine shaft 95 by a sprocket wheel 128 (Fig. 3), chain belt 129 to the shaft of roller 54, a chain belt 131 from the shaft last mentioned to the shaft 132 of the roller 55, and a chain belt 133 from the latter shaft to the shaft 134.

The box 11 is narrowed in at the front end (Fig. 14) to enter in under the discharge from the belts 14 and 15 of frame 13 and it is also narrowed in at the rear where the discharging mechanism for the box is located.

Posts 142 inside box 11 (Fig. 4) help support the frame of the box 11 and the fan frames. Plates 144, (see Fig. 1) extend forward at the ends of the frame 13 to catch any dust that may be carried around by the pipe 38 and thereby direct it to a second action of the brush.

The following frame 13 is not rigid at its four corners but is made to yield a little that is the plates and frame will permit small distortions in the direction of a "diamond shape" to permit it to accommodate itself to the street surface but the details of the construction for this are so various that they are omitted for clearness of illustration.

The several parts may be varied to suit the ideas of the builders from time to time and various different forms of driving mechanisms may be used to drive the several parts in place of those that I have shown but the essential features of the invention will not thereby be changed.

What I claim and desire to secure by Letters Patent is:

1. In a street sweeper, the combination with a rotary brush, of a conduit having an approximately vertical portion and a horizontal portion adjacent and parallel to the brush and laterally open on the side next the same, means for creating an air current, away from the brush, in said conduit, and means for positively engaging and advancing through both said portions, and in the direction of the air current, matter not carried by the current.

2. The combination with a wheel-supported frame, of a rotary brush carried thereby, a power driven belt having a horizontal fold or run near and parallel to the brush and the street's surface and upon that side of the brush toward which material is driven by the lower side of the latter, a stop extending along the middle portion of the belt at some distance above the same, to arrest solid matter thrown by the brush, and a suitable casing inclosing laterally said run and brush.

3. The combination with a wheel-supported frame and a transverse rotary brush carried thereby, of a power driven belt having a plane horizontal fold or run near and parallel to the street's surface and the brush and upon that side of the latter toward which the lower side moves dislodged material, a protecting horizontal plate immediately below said run, and a sectional roller secured to that edge of the plate which is nearest the brush and normally running upon the street's surface, preventing material from being forced under the plate by the brush.

In witness whereof I have hereunto signed my name on the 4th day of November, 1909.

WILLIAM ERASTUS WILLIAMS.

Witnesses:
JOSEPH P. GEIGER,
JOHN L. HAMMOND.

Copies of this patent may be obtained for five cents each, by addressing the "Commissioner of Patents, Washington, D. C."